United States Patent
Dekking et al.

[15] 3,661,620
[45] May 9, 1972

[54] METHOD OF ENCAPSULATING FILLERS WITH POLYMERS

[72] Inventors: Henri Dekking, Rootstown; Edwin M. Maxey, Stow, both of Ohio

[73] Assignee: The General Tire & Rubber Company

[22] Filed: Nov. 26, 1969

[21] Appl. No.: 880,426

[52] U.S. Cl. ......................117/62.2, 106/193 R, 117/72, 117/100 B, 117/100 A, 117/100 S, 117/124 E, 117/161 UA, 117/161 UB, 117/161 UC, 117/161 UF, 117/161 UH, 117/161 UN, 117/161 UT, 260/2.5 AK, 260/2.5 B, 260/37 R, 260/37 SB, 260/37 EP, 260/36, 260/41 A, 260/41 C, 260/41.5 A

[51] Int. Cl. ....................C08k 1/82, B44d 1/48, C03c 17/32

[58] Field of Search...............117/124 E, 72, 100 A, 161, 117/UA, 161 UH, 161 UB, 161 UF, 161 UT, 161 UC, 161 UN, 62.2, DIG. 3; 65/22

[56] References Cited

UNITED STATES PATENTS

| | | | |
|---|---|---|---|
| 3,441,523 | 4/1969 | Dwyer | 117/100 X |
| 3,501,333 | 3/1970 | Groves et al. | 117/100 X |
| 3,507,686 | 4/1970 | Hagenbach | 117/124 X |
| 3,512,294 | 5/1970 | Howald | 117/72 X |
| 3,532,480 | 10/1970 | D'Eustachio | 65/22 |
| 2,140,594 | 12/1938 | Ruff | 117/100 X |
| 2,806,509 | 9/1957 | Bozzacco et al. | 117/100 X |
| 2,978,340 | 4/1961 | Veatch et al. | 65/22 X |
| 3,146,060 | 8/1964 | Canevari | 117/100 X |
| 3,194,678 | 7/1965 | Caldwell | 117/124 X |
| 3,272,772 | 9/1966 | Russell | 117/100 X |
| 3,272,897 | 9/1966 | Herman et al. | 117/100 X |
| 3,346,535 | 10/1967 | Dekking | 117/100 X |
| 3,377,189 | 4/1968 | Acker | 117/100 X |
| 3,382,093 | 5/1968 | Nack | 117/100 X |
| 3,420,645 | 1/1969 | Hair | 117/100 X |
| 3,412,796 | 11/1968 | Dekking | 117/161 |

*Primary Examiner*—William D. Martin
*Assistant Examiner*—Mathew R. P. Perrone
*Attorney*—Frank C. Rote, Jr. and Denbigh S. Matthews

[57] ABSTRACT

A method of rapidly polymerizing a thin coating of thermosetting monomer onto the surface of particulate matter such that the particles will not stick together and may thereafter be handled as a freely flowing material comprising wetting the material's surface with a solution containing a liquid polymerizable monomer and a free radical generating catalyst and then exposing the wet surface to an atmosphere containing sulfur dioxide to effect rapid polymerization.

2 Claims, No Drawings

METHOD OF ENCAPSULATING FILLERS WITH POLYMERS

BACKGROUND OF THE INVENTION

1. Field of the Invention

This invention relates to the field of polymerization. More particularly, this invention relates to rapid polymerization of monomers onto the surface of particulate fillers.

2. Description of the Prior Art

It is well known in the plastic art to use inexpensive particulate fillers to extend relatively expensive polymers and reduce their overall material costs (U.S. Pat. No. 3,441,523). Certain fillers provide additional properties such as mild reinforcing, better abrasion resistance, and increased hardness. Recent developments in filler technology have produced spherical (in contrast to particulate) fillers that have a high reinforcing affect. "Microspheres" and "microballoons" are terms applied to these tiny spherical particles; the solid spherical particles are termed "micropsheres" whereas the hollow spherical particles are termed "microballons." Microspheres and microballons have a major diameter ranging from about 2 to about 100 microns, i.e. 0.002 to 0.100 millimeter. They are made by various proprietary processes from such materials as glass, silica, and polyester and epoxy resins. Generally, they market for about $0.50 per pound which gives them a marked disadvantage as an extending filler since most polymeric compounds cost less than this.

Specifically in the reinforcement of polymeric foams, microballoons have proven outstandingly effective in contrast to both microspheres and other particulate fillers. Microscopic examination of filled polymeric foams has disclosed that microspheres and other particulate-type fillers migrate to the cell vertexes or points where three or more cells join together as well as inside the cells per se; such positioning does not facilitate strengthening or reinforcing of the foam. On the other hand, microballoons have been found to preferentially migrate to the ribs or lines where two cells join together; in this position, they not only displace a large volume of resin, but they provide outstanding reinforcement to the surrounding cell walls. Unfortunately, the cost of these microballoons is also at or above $0.50 per pound which makes their use only marginally attractive in light of the extremely intense competitive pricing of the polymeric foams.

Quite recently, a microballoon material has become available in the price range of $0.50 per pound. This material, termed cellular siliceous glass spheres, is marketed under the trademark CORCEL, and is produced by The Interpace Corporation, Parsippany, N.J. It is in the form of a fine white powder containing virtually no free crystalline silica; moreover, it is not hydroscopic, is chemically inert, has a bulk density of 3 to 4.5 pounds per cubic foot and an apparent specific density of 0.24 gram per cubic centimeter, has a refractive index of 1.435, has a Moh harness index of 5, has a Tyler screen analysis of 55 percent retained on 100 mesh, and 92 percent retained on 325 mesh, and has a surface area of approximately 2 square meters per gram. This microballoon material follows other microballoon fillers in that, in foams, it preferentially migrates to the ribs or lines of adjoining cells, however, it possesses a significant disadvantage in that it is extremely fragile and is easily crushed and damaged under the mildest of foam preparation techniques. The crushed microballoons become a mere mass of fragments that revert to the mode of other particulate fillers and lose reinforcing value.

Thus, there is a need for an inexpensive method of strengthening these CORCEL microballoons to enable one to combine their low cost with high reinforcing ability and provide polymeric foams with an advanced reinforcing filler.

In the encapsulation art, there are many known methods of coating fillers with polymers; they usually involve the steps of slurrying the filler in a polymerizable monomer, slowly polymerizing the monomer onto the surface of the filler, filtering the coated filler from the reacting solution, drying, and comminuting the final product — see U.S. Pats. Nos. 2,140,394, 3,272,772, 3,346,535, and 3,377,189. None of these processes are amendable to the CORCEL brand microballoons. Not only are the multiple steps expensive in materials, by-products, processing equipment, and labor, but the step of comminuting the aggregated materials would necessarily crumble the microballoons and render them useless.

This invention concerns a method of strengthening CORCEL microballoons in an inexpensive manner. The novel product produced by these methods, i.e. encapsulated and reinforced microballoons, provide the foam industry with an inexpensive, low density filler that, as described earlier, preferentially migrates to the ribs of adjoining cells to displace resin as well as to provide outstanding reinforcement to the foam products. In addition, this invention provides the art with another means of encapsulating other particulate fillers with polymers to compatibilize them with different polymeric systems.

Therefore, the main object of this invention is a method of coating microballoons with polymers to strengthen them for use as fillers for plastic and polymeric foam systems. Other objects include a method of encapsulating particulate fillers to compatibilize them with different polymeric systems. These methods require a relatively small amount of equipment, are simple to practice and relatively insensitive to environmental conditions such as temperature and pressure, have virtually no scrap loss or by-products, may be practiced with existing process equipment, are amenable to automatic control, and produce products that find wide use in the plastic and polymeric foam industry as inexpensive extenders and a reinforcing filler material.

SUMMARY OF THE INVENTION

A method of strengthening a microballoon filler comprising the steps of wetting the surface of the microballoon with a solution comprising a liquid polymerizable monomer selected from the group consisting of acrylic acid, esters of acrylic acid containing less than about 12 carbon atoms per molecule, acrylonitrile, vinyl chloride, and admixtures, thereof, and an organic free radial generating agent selected from the group consisting of hydrogen peroxide, methyl ethyl ketone peroxide, hydroperoxides, and admixtures thereof, and exposing the wetted surface to an atmosphere containing an effective amount of sulfur dioxide necessary to rapidly polymerize the polymerizable monomer to form a hard coating of polymer on the surface of the microballoon.

DESCRIPTION OF THE PREFERRED EMBODIMENT

This invention pertains to fillers in general and to microballoons in particular for use in plastics and polymeric foams. The plastics which benefit from this invention include thermoplastic and thermosetting type plastics; examples of the former include acrylonitrile-butadiene-styrene (ABS) plastic, polystyrene, and polycarbonate, while examples of the latter include formaldehyde resin, urea-formaldehyde resin, polyester resin, and polyepoxides.

Polymeric foams encompass a wide variety of materials. First, the foams may be rigid, semi-rigid, and flexible; examples of these include styrene rigid foam and urea-formaldehyde rigid foam, polyurethane semi-rigid foam and polyvinyl chloride semi-rigid foam, and polyurethane flexible foam and rubber latex flexible foam. Secondly, the foams may be made from thermoplastic materials, thermosetting materials, and mixtures of the two materials; examples of these include polystyrene foam, urea-formaldehyde foam, and polyurethane-polyvinyl chloride foam. Thirdly, the foams may be made from plastics and rubbers; examples of the former include phenolic, polyvinyl chloride, polystyrene, polyurethane, polyethylene, cellulose acetate, and silicone foams; examples of the latter include natural rubber, acrylic rubber, chlorosulfonated polyethylene, epichlorohydrin rubber, ethylene-propylene copolymers, ethylene-propylene-diene terpolymers, fluoro-elastomers, isobutylene-isoprene (Butyl) rubber, isoprenesacrylonitrile rubber, nitrile rubber, polybutadienes, polychloroprenes, polyisobutylenes, polyisoprenes, polysulfides, silicone rubber, styrene-butadiene rubber, and urethane foams.

A popular polymer foam and one that is particularly applicable to this invention is polyurethane foam which is a thermosetting plastic foam that may be made in rigid, semi-rigid, and flexible form by two general methods. The first and most widely accepted method is to react an isocyanate, which is the reaction product of phosgene and an amine or one of its salts, with a compound containing an active hydrogen, i.e. a compound which gives a positive Zerewithof test*. (*The Zerewithof test involves addition of the compound in question to a Grignard solution of methyl iodine; a positive test occurs when the compound decomposes the Grignard reagent to liberate methane gas. The second method is to react an alcohol with phosgene to form the alcohol ester of chlorocarbonic acid and then react that with a primary or secondary amine to form the urethane. Optionally, other ingredients may be used in these methods such as water, auxiliary blowing agents, catalysts, and surface active agents.

An example of the first method is the reaction between a polyol (either polyester or polyether) and an organic polyisocyanate with water, fluorocarbons, and catalysts, wherein the polyol reacts with some of the isocyanate to form a chain extended polyurethane, more of the isocyanate reacts with the water to form carbamic acid that breaks down to form a primary amine and carbon dioxide, the carbon dioxide and fluorocarbons expand the polyurethane into a cellular structure or foam, and the primary amine formed from the gas reaction reacts with further isocyanate to form a disubstituted urea which in turn, reacts with more isocyanate to form crosslinking biuret and allophanate structures.

An examples of the second method is the reaction between an aliphatic diamine and bischloro formate of a glycol to form the polyurethane. The bischloro formates are obtained by the reaction of phosgene with glycols such as diols and triols.

Polyester polyols are formed from the condensation of a polyhydric alcohol and a polycarboxylic acid. Examples of suitable polyhydric alcohols include the following: glycerol; polyglycerol; pentaerythritol; polypentaerythritol; mannitol, trimethylolpropane; sorbitol; methyltrimethylol-methane; 1,4,6-octanetriol; butanediol; pentanediol; hexanediol; dodecanediol; octanediol; chloropentanediol; glycerol monoallyl ether; glycerol monoethyl ether; triethylene glycol; 2-ethylhexanediol-1,4; 3,3'-thiodipropanol; 4,4'-sulfonyldihexanol; cyclohexanediol-1,4; 1,2,6-hexanetriol; 1,3,5hexanetriol; polyallyl alcohol; 1,3-bis(2-hydroxyethoxy) propane; 5,5'-dihydroxydiamyl ether; tetrahydrofuran-2,5-dipropanol; tetrahydrofuran-2,5-dipentanol; 2,5-dihydroxytetrahydrofuran; tetrahydrothiophene-2,5-dipropanol; tetrahydropyrrol-2,5-propanol; 4-hydroxy-3-hydroxytetrahydropyran; 2,5-dihydroxy-3,4-dihydro-1,2-pyran; 4,4'-sulfinyldipropanol; 2,2-bis(4-hydroxyphenyl)-propane; 2,2'-bis(4-hydroxyphenyl)-methane, and the like. Examples of polycarboxylic acids include the following: phthalic acid, isophthalic acid; terephthalic acid; tetrachlorophthalic acid; maleic acid; dodeclymaleic acid; octadecenylmaleic acid; fumaric acid; aconitic acid, itaconic acid, trimellitic acid; tricarballylic acid; 3,3'-thiodipropionic acid; 4,4'-sulfonyldihexanoic acid; 3-octenedioic-1,7 acid; 3-methyl-3-decenedioic acid; succinic acid; adipic acid; 1,4-cyclohexadiene-1,2-dicarboxylic acid; 3-methyl-3,5-cyclohexadiene-1,2-dicarboxylic acid; 3-chloro-3,5-cyclohexadiene-1,2-dicarboxylic acid; 8,12-eicosadienedioic acid; 8-vinyl-10-octadecenedioic acid; and the corresponding acid anhydrides, acid chlorides and acid esters, such as phthalic anhydride, phthaloyl chloride, and the dimethyl ester of phthalic acid. Preferred polycarboxylic acids are the aliphatic and cycloaliphatic dicarboxylic acids containing no more than 14 carbon atoms and the aromatic dicarboxylic acid containing no more than 14 carbon atoms. Polyethers are generally made by reacting an alkylene oxide such as propylene oxide with a strong base such as potassium hydroxide.

A wide variety of polyisocyanate compounds may be used in the polyurethane reaction. Examples of some of these include toluene-2,4-diisocyanate, 1,5-naphthalenediisocyanate, cumene-2,4-diisocyanate, 4-methoxy-1,3-phenylenediisocyanate, 4-chloro-1,3-phenylenediisocyanate, 4-bromo-1,3-phenylene-diisocyanate, 4-ethoxy-1,3-phenylenediisocyanate, 2,4'-diisocyanatodiphenylether, 5,6-dimethyl-1,3-phenylenediisocyanate, 2,4-dimethyl-1,3-phenylenediisocyanate, 4,4'-diisocyanatodiphenylether, benzidinediisocyanate, 4,6-dimethyl-1,3-phenylenediisocyanate, 9,10-anthracenediisocyanate, 4,4'-diisocyanatodibenzyl, 3,3-dimethyl-4,4'-diisocyanatodiphenylmethane, 2,6-dimethyl-4,4'-diisocyanatodiphenyl, 2,4-diisocyanatostilbene, 3,3'-dimethyl 4,4'-diisocyanatodiphenyl, 3,3'-dimethoxy-4,4'-diisocyanatodiphenyl, 1,4-anthracenediisocyanate, 2,5-fluorenediisocyanate, 1,8-naphthalenedi-isocyanate,2,6-diisocyanatobenzfuran, and 2,4,6-toluenetriisocyanate. It is to be understood that mixtures of two or more of these polyisocyanates may be employed. Aromatic isocyanates are preferred, particularly toluene diisocyanate.

Catalysts are added to accelerate the different reactions. The chain-extension reaction, where the polyol reacts with the isocyanate to produce the urethane, is accelerated by tertiary amines, especially when they contain a tin co-catalyst. The tertiary amines also catalyze the gas reaction; alkyl morpholines contribute certain physical properties to the foam such as tear resistance and tensile strength. Suitable tertiary amines include triethylene diamine, tetramethyl butane diamine, triethylamine, n-methyl morpholine, N-ethyl morpholine, diethyl ethanolamine, N-coco morpholine, 1-methyl-4-dimethylamino ethyl piperazine, 3-methoxy-N-dimethyl propyl amine, N-dimethyl-N'-methyl isopropyl propylene amine, N,N-diethyl-3-diethyl amino propyl amine, and dimethyl benzyl amine. Examples of tin co-catalysts include dibutyl tin dilaurate, stannous chloride, dibutyl tin di-2-ethyl hexoate, stannous octoate, and stannous oleate. The surface active agent, when used, stabilizes the cell structure during foam rise and prevents slumping, collapsing, and ripping of the cells.

This invention has two major aspects, strengthening microballoons and encapsulating fillers. The different lies in both the process and the products. Whereas conventional particulate fillers such as clays, calcium carbonate, and carbon black may be encapsulated, microballoons may be coated on both the inside and outside surfaces with polymer. This dual-coating aspect is significant in that the microballoons may be made exceptionally strong by utilizing both coatings and also in that partially damaged or crushed microballoons may be rendered almost spherical again by becoming filled with polymer. By rendering broken microballoons spherical, one may maintain a high degree of reinforcing ability in the microballoons almost regardless of their pre-strengthened condition, i.e. even through there is a large amount of damage. Solid particulate fillers, on the other hand, do not obtain this "revitalization" by encapsulation.

Generally, this invention is applied to all particulate fillers, including microspheres and microballoons, by forming a solution comprising a liquid polymerizable monomer and an organic free radical generating agent, wetting the surface of the filler with this solution, and then exposing the wetted surface to an atmosphere containing sulfur dioxide ($SO_2$) gas. The organic free radical generating agent and the $SO_2$ appear to form a co-catalysts system that causes almost instantaneous polymerization of the monomer. With microballoons, the low viscosity solution seeps into the damaged balloons and polymerizes onto both wall surfaces and possibly fills the balloon under the force of surface tension and polymerizes into a microsphere. With other fillers, the solution wets only the outer surface and polymerizes to encapsulate the particles.

The liquid polymerizable monomers of this invention may be selected from the group consisting of acrylic acids, esters of acrylic acids containing less than 12 carbon atoms per molecule, acrylonitrile, vinyl chloride, and admixtures thereof. Acrylic esters having more than about 12 carbon atoms per molecule generally polymerize too slowly to be of use in this invention. Examples of polymerizable acrylic esters usable herein include methyl acrylate ethyl acrylate, butyl acrylate, methyl methacrylate, ethyl methacrylate, butyl methacrylate, methyl ethacrylate, ethyl ethacrylate, and butyl ethacrylate. These monomers are all liquids at room temperature with the exception of vinyl chloride that is a liquid that boils at $-14°$ C. In the case of vinyl chloride, the filler is wetted and reacted at a temperature below $-14°$ C. The amount of monomer polymerized onto the filler, or monomer "pick-up," may vary widely, e.g. 10–50 percent by weight, depending on various factors such as particle size and monomer viscosity.

The organic free radical generating agents of this invention may be selected from the group consisting of hydrogen peroxide, methyl ethyl ketone peroxide, hydroperoxides, and admixtures thereof. Examples of hydroperoxides usable herein are diisopropylbenzene hydroperoxide, 2,5-dimethylhexane-2,5 -dihydroperoxide, and t-butylhydroperoxide. The slow peroxides such as benzoyl peroxide and lauroyl peroxide do not generate free radicals fast enough for use herein and thus are not a part of this invention. These agents may be used in an amount ranging from about 0.5 percent by weight and higher.

In wetting the filler or microballoon with this aforedescribed solution, one may simply slurry it in the liquid solution or, depending upon other factors such as the particular equipment involved, incorporate other methods of wetting such as spraying the solution onto a moving conveyor belt carrying the filler. The surface of the wetted filler is now exposed to an atmosphere containing sulfur dioxide. It appears that the combination of sulfur dioxide and the organic free radical generating agents disclosed herein cooperate to provide an extremely high rate of polymerization of the liquid monomers. It has been empirically determined that the propagation rate of polymerization is in the order of 1 mole per liter per second. The amount of sulfur dioxide necessary to promote such a polymerization rate is less than a fully saturated atmosphere of the gas and can only be described as "an effective amount" which is the amount necessary to provide a reaction rate on the order of about 1 mole per liter per second.

There are various methods of exposing the fillers to this atmosphere containing sulfur dioxide. A very simple yet highly effective method is to vertically position a long (i.e. about 10 feet) hollow tube, seal the bottom, and fill the tube with sulfur dioxide gas. The density of sulfur dioxide (1.434) enables it to remain in the tube. A quantity of filler particles, wetted with the aforedescribed solution, is then sprayed or sprinkled into the top of the hollow tube and permitted to drop down to the seal plate. The polymerization is so rapid that by the time the particles reach the bottom of the tube, they are coated with a hard polymeric coating. Others methods of exposing the wetted fillers to sulfur dioxide are possible. For instance, the wetted particles may be introduced into a cyclone separater wherein the gas flow rate is maintained such that the heavy, encapsulated particles drop out the bottom and the lighter wetted particles remain in the gas stream until polymerization is complete. Another method is to drop the particles down a tower containing a counter current flow of $SO_2$.

Sulfur dioxide gas appears to be the only gas which will produce this rapid polymerization; chlorine, nitric oxide, hydrogen sulfide, carbon monoxide, sulfuryl fluoride, and carbon dioxide gasses have been found not to promote the same speed of polymerization. The polymerization reaction caused by the sulfur dioxide and free radical generating agents is generally insensitive to temperature and pressure. That is to say, tests have shown that temperatures from below the boiling point of vinyl chloride ($-14°$ C.) to above 150° F. and pressures from atmospheric to more than 40 pounds per square inch do not greatly affect the speed or degree of polymerization.

This invention is applicable to virtually all types of particulate fillers. Examples of these include calcium carbonate powders, barium sulfate, kaolin, carbon black, silica, titanium dioxide, iron oxide, organic resins, and polymers, Fuller's earth, and wood flour. All may benefit from this invention.

Another feature of this invention is to coat fillers, including microspheres and microballoons, with a layer of polymer, wet the polymer coated filler with another solution comprising a second (and possibly different) liquid polymerizable monomer, and then re-expose these wetted fillers to the atmosphere containing an effective amount of sulfur dioxide so as to apply successive layers of polymers to the fillers. This feature of the invention may be utilized to place a rigidifying or strengthening coat of polymer about a fragile filler and then to place an additional coating thereover to compatibilize the filler with a particular polymer system. By this means, fillers may be strengthened and made compatible with different polymers and this feature is fully contemplated in this invention.

Following are examples given to show one skilled in the art an indication of how to practice this invention and to show some beneficial aspects of the invention such as the ease in which the invention is practiced, the simplicity of the method, the efficacy of the polymerization step, the speed at which the polymerization takes place and other aspects. As appears hereinafter, all parts are parts per 100 parts of monomer and all percents are percents by weight unless otherwise noted.

EXAMPLE 1

Separate twenty (20) gram samples of CORCEL microballoons were treated by placing a sample in a plastic bag into which was blown nitrogen gas. The nitrogen inflated the bag and gave a violent swirling action to the sample. While thus suspended, a mixture of twenty (20) grams of different monomers, each containing 2 percent t-butyl hydroperoxide, were sprayed into the bag. Immediately thereafter, with the wetted filler particles still in motion, sulfur dioxide ($SO_2$) gas was introduced into the bag for a few seconds. After about 5 minutes the nitrogen flow was stopped and the coated microballoons collected and washed in acetone to remove residual monomer. The samples were then dried and weighted to determine the percent monomer "pick-up." Below in Table 1 is a list of each sample showing the amount of monomer "pick-up" in some cases.

TABLE 1

| Monomer | Rapid Polymerization | Monomer Pick-Up (%) |
|---|---|---|
| Acrylic acid | Yes | 3.8 to 49.4 |
| Methyl acrylate | Yes | 46.1 |
| Acrylonitrile | Yes | |
| Styrene-acrylonitrile | No | |
| Acrylic acid - acrylonitrile (50:50) | Yes | |
| Vinyl chloride | Yes | |

This example shows that monomers selected from the group consisting of acrylic acid, esters of acrylic acid containing less than about 12 carbon atoms per molecule, acrylonitrile, vinyl chloride, and admixtures thereof are operative in this invention whereas other monomer combinations such as styrene-acrylonitrile are not operative.

EXAMPLE 2

Separate twenty (20) gram samples of CORCEL microballoons were treated with solutions containing methyl acrylate and 2 percent of each of different organic free radical generating agents and processed as described in Example 1. Below in Table 2 is a list of the different organic free radical generating agents used and the amount of monomer "pick-up" in each case.

TABLE 2

| Organic Free Radical Generating Agent | Rapid Polymerization |
| --- | --- |
| Hydrogen peroxide | Yes |
| t-butyl hydroperoxide | Yes |
| Methyl ethyl ketone peroxide | Yes |
| Diisopropyl benzene hydroperoxide | Yes |
| 2,5 dimethylhexane-2,5 dihydroperoxide | Yes |
| Benzoyl peroxide | No |
| Lauroyl peroxide | No |
| Azobisisobutyronitrile | No |

This example shows that organic free radical generating agents selected from the group consisting of hydrogen peroxide, methyl ethyl ketone, peroxide, hydroperoxides and admixtures thereof give the required rapid polymerization in this invention whereas other organic free radical generating agents such as benzoyl peroxide, lauroyl peroxide, and azobisisobutyonitrile do not.

EXAMPLE 3

Separate twenty (20) gram samples of CORCEL microballoons were treated with a solution of acrylic acid containing 2.0 percent t-butylhydroxide and processed as described in Example 1 with the exception that the amount of $SO_2$ gas was varied in each case. Below in Table 3 is a list of the amounts of $SO_2$ used in the polymerizing atmosphere and an indication of whether rapid polymerization occurred.

TABLE 3

| % (Volume) $SO_2$ | Rapid Polymerization |
| --- | --- |
| 100 | Yes |
| 75 | Yes |
| 50 | Yes |
| 25 | Yes |
| 10 | Yes |
| 5 | Yes |

This examples shows that the amounts of sulfur dioxide necessary to polymerize acrylic acid containing t-butylhydroxide is less than 100 volume percent. The fact that the amount of $SO_2$ necessary to cause rapid polymerization varies with each monomer and free radical generating agent and is less than 100 percent in all cases, supports the terminology of "an effective amount of sulfur dioxide."

What is claimed is:

1. A method of rapidly polymerizing a thin coating of a liquid thermosetting monomer onto the surface of microballoons such that the microballoons will not stick together and may thereafter be handled as a freely flowing material comprising:
   a. wetting the surface of the microballoons with a solution consisting of a liquid polymerizable monomer selected from the group consisting of:
      1. acrylic acid,
      2. esters of acrylic acid containing less than about 12 carbon atoms per molecule,
      3. acrylonitrile,
      4. vinyl chloride, and,
      5. admixtures thereof; and an organic free radical generating agent selected from the group consisting of:
         1. hydrogen peroxide,
         2. methyl ethyl ketone peroxide,
         3. hydroperoxides, and
         4. admixtures thereof; and,
   b. exposing said wetted microballoons individually to an atmosphere containing an effective amount of sulfur dioxide necessary to rapidly polymerize said monomer to a hard, nontacky film on the surface of each microballoon.

2. The method of claim 1 including the subsequent step of repeating the process with the same microballoons to form successive layers of polymer thereon.

* * * * *